UNITED STATES PATENT OFFICE.

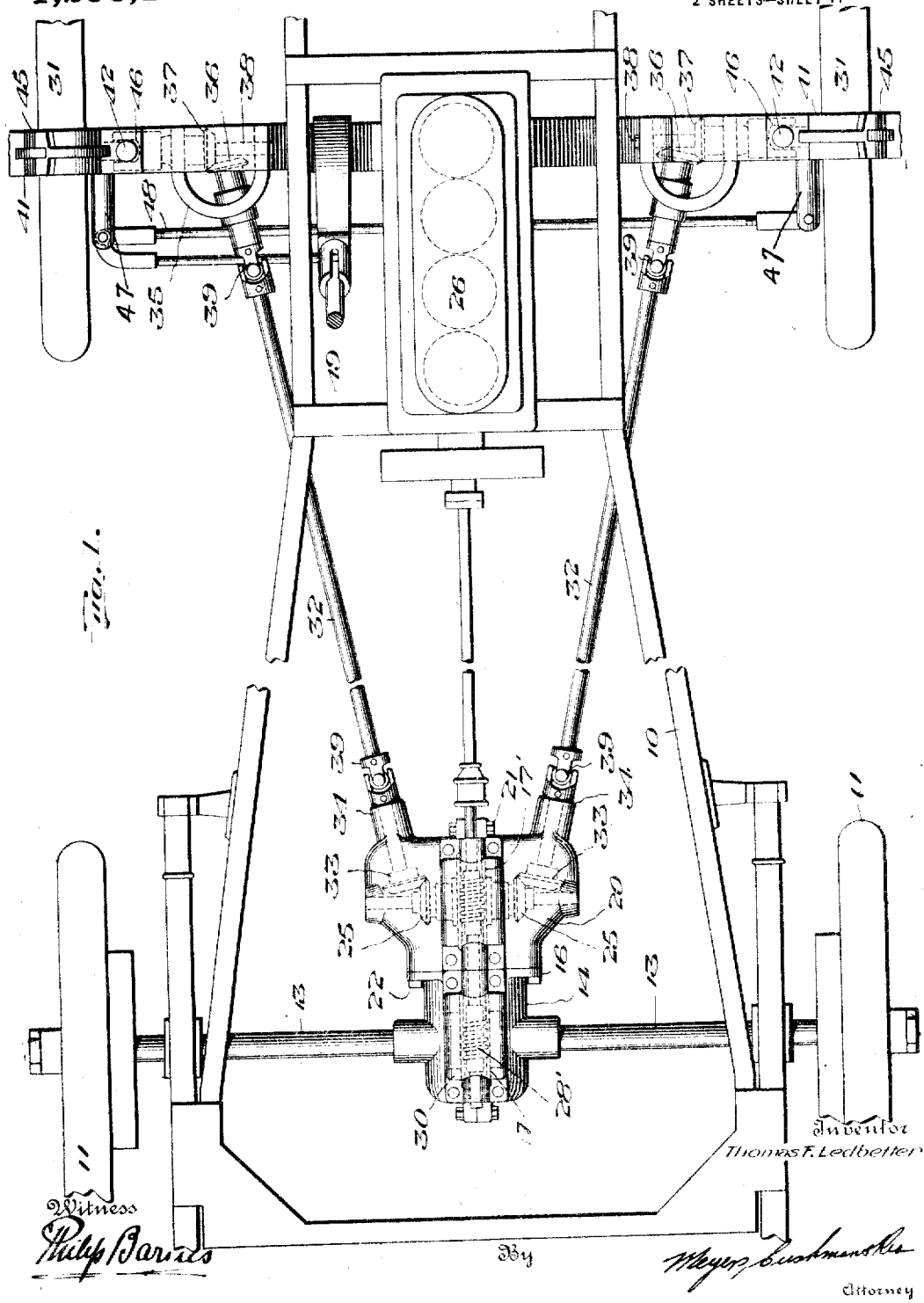

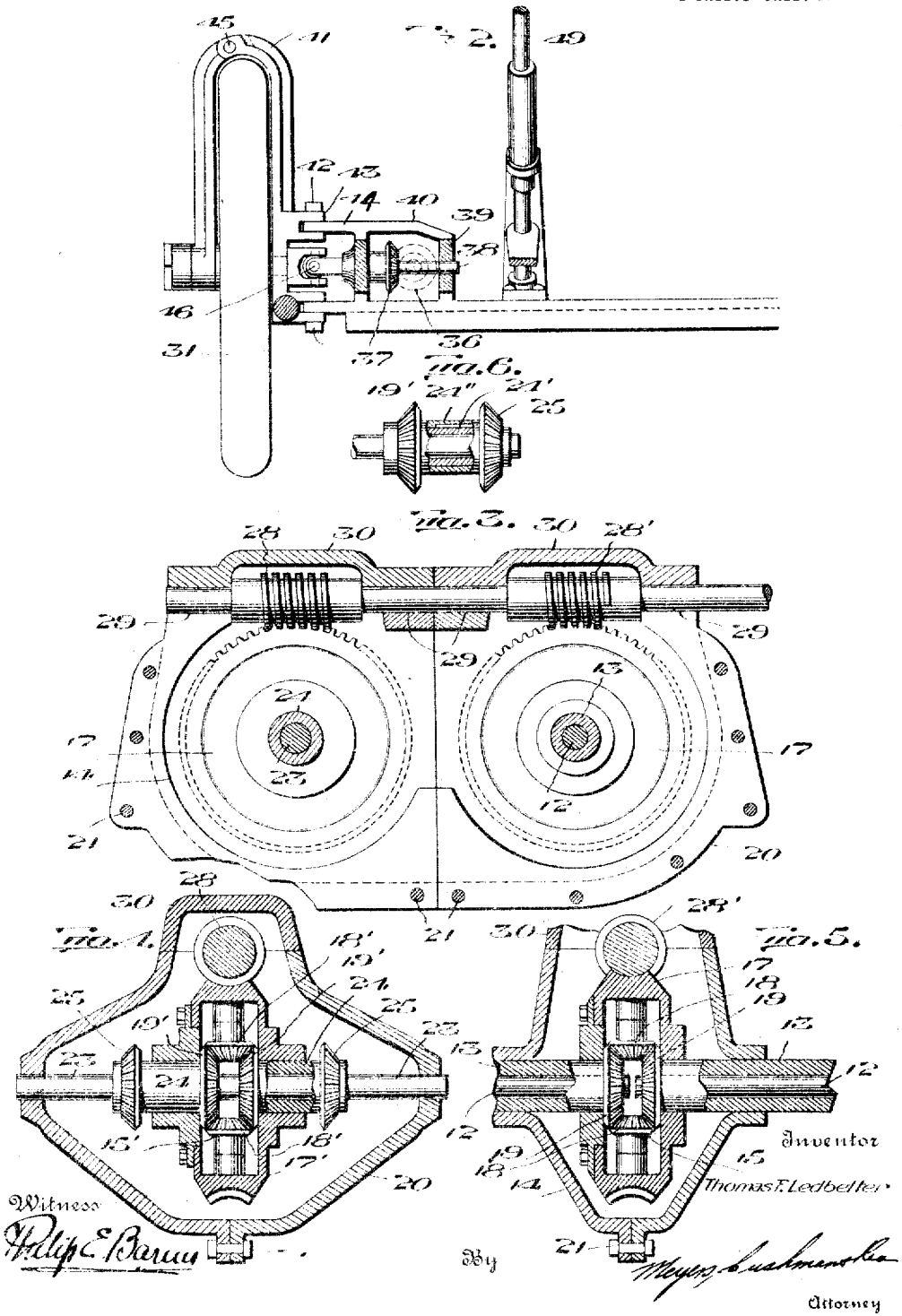

THOMAS F. LEDBETTER, OF COLUMBUS, GEORGIA.

FOUR-WHEEL DRIVE MECHANISM FOR MOTOR-VEHICLES.

1,258,126.

Specification of Letters Patent.  Patented Mar. 5, 1918.

Application filed April 30, 1917. Serial No. 165,601.

*To all whom it may concern:*

Be it known that I, THOMAS F. LEDBETTER, a citizen of the United States, residing at Columbus, in the county of Muskogee and State of Georgia, have invented new and useful Improvements in Four-Wheel Drive Mechanism for Motor-Vehicles, of which the following is a specification.

This invention relates to motor vehicles, and has particular reference to a driving mechanism therefor.

The purpose of my present invention is to provide a driving mechanism for connecting all four wheels of a motor vehicle with the source of power, this mechanism being very simple in construction, efficient in operation, and of sufficient strength to resist strains to which it is subjected.

One of the main objects of my invention is to provide a four wheeled driving mechanism for motor vehicles in which the connection to one set of wheels may be easily disconnected or removed from the vehicle, when it is not desired, for any reason, to drive all four wheels, without affecting or in any way interfering with the connection between the source of power and the other set of wheels.

More particularly my invention has as its object to provide in a four-wheeled driving mechanism a differential mechanism for the front or steering set of wheels, and a second differential mechanism for the rear wheels, both of these differential mechanisms being driven from a single drive shaft connected to the source of power, but the differentials being independent of each other so that the differential gearing for the front wheels and the connection between this gearing and the front wheels may be removed without disturbing the connection between the source of power and the rear wheels. Furthermore, in case of accident to the connection of the front wheels, the differential gearing therefor may be lowered in its casing without interfering with any of the other connections.

The above and other objects of my invention are obtained in the structure described in the following specification and illustrated in the accompanying drawings wherein—

Figure 1 is a top plan view of a motor vehicle to which my improvements are applied, the body of the vehicle being removed.

Fig. 2 is a sectional view taken on a transverse line rearwardly of the front axle and showing the manner of mounting the front wheels.

Fig. 3 is a longitudinal view of the differential mechanisms, one side of each of the differential casings being removed.

Fig. 4 is a sectional view taken transversely through the differential mechanism for the front wheels.

Fig. 5 is a sectional view taken transversely through the differential mechanism for the rear wheels.

Fig. 6 is a view, partly in section, of a set of gears employed in the differential mechanism for the front wheels.

Referring to the drawings wherein like numerals represent like parts in the several views, 10 designates a chassis of an automobile which may be of any suitable construction that shown in the drawings being by way of illustration only. The rear wheels 11 are fixed to the outer ends of the rear shafts 12 which are rotatably mounted within the tubular axle sections 13. Mounted upon the inner ends of the shaft sections 13 is a casing 14 which houses a differential gearing mechanism 15 (see Fig. 5). The casing 14 is split longitudinally and at its forward end is open and provided with an outstanding flange 16.

In the present instance, the differential gearing mechanism 15 comprises a large hollow gear wheel 17 having teeth upon its periphery and carrying within its interior small gears 18 meshing with gears 19 fixed to the inner ends of the shaft sections 12. It is to be understood that while I have described a particular form of differential gearing mechanism, any suitable type may be employed, that shown in the drawings being disclosed for illustrative purposes.

Secured to the forward end of the casing 14 is a second casing 20 which houses the differential mechanism for the front wheels. The casing 20 is also split longitudinally into two parts of similar construction, these parts being removably secured together by bolts 21 or the like. The casing 20 abuts at its rearward open end against the flange 16 and is removably secured thereto by bolts 22.

In the present case, a fixed shaft 23 extends transversely across the interior of the casing 20 and has its ends fixed in through openings in the walls thereof. The shaft 23 is fixed against rotation and comprises a single rod. Loosely mounted upon the shaft 23 is a differential mechanism 15' which is similar to the differential 15 for the back wheels in that it comprises a hollow gear 17' having teeth on its outer periphery and housing the intermeshing gears 18' and 19'. Each of the gears 19' is connected by means of a sleeve 24 with a bevel gear 25 located externally of the gear wheel 17'. The gears 19' may be integral with the sleeves 24 as shown in Fig. 4, or the gears 19' may be provided with a sleeve 24' adapted to telescope into and be splined to a larger sleeve 24" fixed to the gear 25, as shown in Fig. 6. By the construction just described, it is to be noted that the differential mechanism for the front wheels floats or is loosely mounted upon the fixed shaft 23 so that the shaft may be removed longitudinally from the casing 20 and when so removed, the differential will drop to the bottom of the casing.

26 designates the source of power such as an electric motor, or an internal combustion engine. A drive shaft 27 extends rearwardly from the source of power and over the gear wheels 17 and 17'. The shaft 27 has a worm gear 28' meshing with the gear 17' of the differential for the front wheel, and a second worm gear 28 meshing with the gear 17 of the differential located upon the rear axle. The shaft 27 is rotatably mounted in bearing surfaces 29 in the top of the casings 14 and 20, and it is maintained in place by caps 30, removably secured to the casings.

The front wheels 31 are driven from the differential 15' by means of connecting rods 32 having upon their rear ends bevel gears 33 meshing with the gears 25. The rear end of each of the rods 32 is mounted in a bearing 34 carried by the casing 20, and the front ends of the rods 32 are mounted in bearings carried by brackets 35. The front end of each rod carries a gear 36 meshing with a gear 37 carried on the inner end of a stub shaft 38 to which the front wheel 31 is secured.

Each of the stub shafts 38 is mounted in bearings provided in spaced-apart uprights 39 rising from the front axle and connected together by means of a bridge-piece 40. The bracket 35 which serves as a bearing member for the rod 32 extends laterally from these uprights. It will be seen that the shaft 38 is supported in suitable bearings to each side of the driving gear 37, and that a simple but strong structure is provided.

The front wheels are mounted in U-shaped yokes 41 which are pivoted to the front axle of the vehicle by means of pins 42 which pass through openings in registering ears 43 and projections 44 on the yoke and axle respectively. The yoke 41 has its outer arm hinged, as at 45, to facilitate removal of the wheels. Each of the stub shafts 38 has bearings in both arms of the U-shaped yoke 41 and is provided with a universal joint 46 to permit turning movement of the front wheels. Extending rearwardly from the yokes 41 are arms 47 connected by a transverse rod 48 so that the front steering wheels will move in unison when the steering rod 49 is rotated.

It will be seen from the structure above described that the front wheels are driven from one differential and the rear wheels from a second differential and that both of the differentials are driven by the same source of power. By providing a differential for the front wheels which is distinct from the differential for the rear wheels, steering of the device is in no way interfered with, for when turning a curve the outside wheels, that is, the outside front wheel and the outside rear wheel, will rotate faster than the inside wheels. Furthermore, the differential for the front wheels and the connections between this differential and the front wheels may be readily removed from the vehicle when for any reason it is not desired to drive the front wheels. This is simply accomplished by removing the cap 30 from over the worm 28' and then removing the differential casing 20 together with its contained mechanism by withdrawing the bolts 22. The front ends of the rods 32 will then be withdrawn from their bearings in the brackets 35. In the event that an occasion arises in which it is desired to disconnect the front wheels from the source of power when on a tour, it is only necessary to disconnect the front wheels to remove the fixed shaft 23, upon which the differential mechanism for the front wheels is mounted, longitudinally from the casing 20. The differential mechanism 15' will then drop to the bottom of the casing 20 and thus the gear wheel 17' would be moved from mesh with the worm gear 28' of the drive shaft 27.

It is, of course, obvious that my invention is susceptible of various changes and modifications which would be within the spirit of this invention without departing from the scope of the followng claims.

What I claim is:

1. In a four-wheel drive, a first differential gearing for one set of wheels, a casing therefor, a second differential gearing for the second set of wheels, a casing for said second differential gearing adapted together with its contained parts to be removed without disturbing said first differential gearing, and a source of power for driving said gearings.

2. In a four-wheel drive, a first differential gearing for one set of wheels, a casing therefor, a second differential gearing for the other set of wheels and independent of said first differential gearing, a casing for said second differential gearing, means for detachably securing said second casing in position so that it may be removed without disturbing said first differential gearing, and a source of power for driving said gearings.

3. In a four-wheel drive, a differential gearing for one set of wheels, a casing therefor, a second differential gearing for the other set of wheels, a casing therefor, means for detachably securing the two casings together, a single drive shaft for both of said gearings, and a source of power for driving said drive shaft.

4. In a four-wheel drive, rear wheels, rear shafts for said wheels, a differential gearing for said rear wheels, a casing housing said differential gearing, front wheels, axles therefor, a second differential gearing located adjacent to and immediately in front of said first differential gearing, a casing for said second differential gearing removably secured to said first casing, connections between said second differential gearing and the front axles, and a driving shaft having gears meshing with said differential gearings.

5. In a four-wheel drive, rear wheels, rear axle sections, rear shafts in said axle sections to which the rear wheels are fixed, front wheels, stub shafts carrying said front wheels, a first differential gearing on said rear shaft having a driven gear wheel, a casing housing said first differential gearing, a second differential gearing for said front wheels located immediately in front of said first differential gearing and having a gear wheel in alinement with said first gear wheel, a casing for said second differential gearing, connections between the second differential gearing and the front stub shafts, a drive shaft extending through said casings immediately above said gear wheels and gears on said drive shaft meshing with said gear wheels of the differentials.

6. In a four-wheel drive, rear wheels, rear axle sections, rear shafts in said axle sections to which the rear wheels are fixed, front wheels, stub shafts carrying said front wheels, a first differential gearing on said rear shafts having a driven gear wheel, a casing housing said first differential gearing, a second differential gearing for said front wheels located immediately in front of said first differential gearing and having a gear wheel in alinement with said first gear wheel, a casing for said second differential gearing, means for detachably connecting said casings together, connections between the second differential gearing and the front stub shafts, a drive shaft extending through said casings immediately above said gear wheels, and gears on said drive shaft meshing with said gear wheels.

7. In a four-wheel drive, a differential gearing for the rear wheels, a casing therefor, a second differential gearing for the front wheels, a casing for said second differential gearing, means for detachably securing the two casings together so as to form substantially a single casing, bearings in the top of each of said casings, a drive shaft rotatably mounted in said bearings, a gear on said drive shaft for the first differential gearing, a gear on the drive shaft for each of said differential gearings, and caps removably secured to said casings over said gears on the drive shaft.

8. In a four-wheel drive for motor vehicles, a first differential gearing for one set of wheels, a second differential gearing for the other set of wheels independent of said first differential gearing, a shaft on which said second differential gearing is rotatably or loosely mounted, connections between said second differential gearing and one set of wheels, and a single drive shaft for both of said differential gearings, said shaft on which said second differential gearing is mounted being adapted to be removed to break the driving connection between said second differential gearing and the drive shaft without interfering with the connection between the drive shaft and the first differential gearing.

9. In a four-wheel drive for motor vehicles, rear wheels, rear shafts on which said rear wheels are mounted, a differential gearing for said rear shafts, front wheels, shafts on which said front wheels are mounted, a differential gearing for said front wheels, a casing for said second differential gearing, a shaft on which said second differential gearing is loosely mounted and adapted to be withdrawn to permit the second differential to drop to the bottom of its casing, a single drive shaft for both of said gearings, and a source of power for driving said drive shaft.

10. In a four-wheel drive for motor vehicles, a first differential gearing for one set of wheels, a casing therefor, a second differential gearing for the other set of wheels and independent of said first differential gearing, a casing for said second differential gearing, means for detachably securing said casing in place so that it may be removed without disturbing the first differential gearing, a fixed shaft extending through said second casing and upon which said second differential gearing is loosely mounted so that the shaft may be withdrawn to permit the differential gearing to drop to the bottom of its casing, and a source of power for driving said gearing.

11. Driving mechanism for motor vehicles comprising, in combination, a rear axle provided with a casing, shaft sections in said axle for the rear wheels, a differential gearing within said casing connected to said shaft sections, a second differential gearing for the front wheels, a casing for said second differential gearing detachably connected to said first casing, a source of power, a single drive shaft between the source of power and said differential gearings, a front axle, stub shafts mounted in bearings on said front axle and adapted to receive the front steering wheels, a gear on each of said stub shafts, a pair of driven shafts each having a gear at its rear end meshing with its respective gear of said second differential gearing, and a gear on the front end of each of said driven shafts in mesh with one of the gears on said stub shafts.

12. Driving mechanism for motor vehicles comprising, in combination, a rear shaft having a casing, a first differential gearing in said casing, rear shaft sections in said axle, a second differential gearing for the front wheels, a casing housing said second differential and detachably connected to said first casing, a front axle, stub shafts for the front wheels mounted in bearings on the front axle, a yoke extending about said wheel and having bearings on the opposite sides of the wheel for the reception of said stub shaft, a gear on each of said stub shafts, a pair of driven shafts each having a gear at its front end in mesh with the gear on one of said stub shafts, and a gear at its rear end within said second casing and meshing with its respective gear of said second differential gearing.

In testimony whereof I have hereunto set my hand.

THOMAS F. LEDBETTER.